May 30, 1961 G. SMITH 2,986,714
POSITION MEASURING DEVICE
Filed Oct. 21, 1958 2 Sheets-Sheet 1
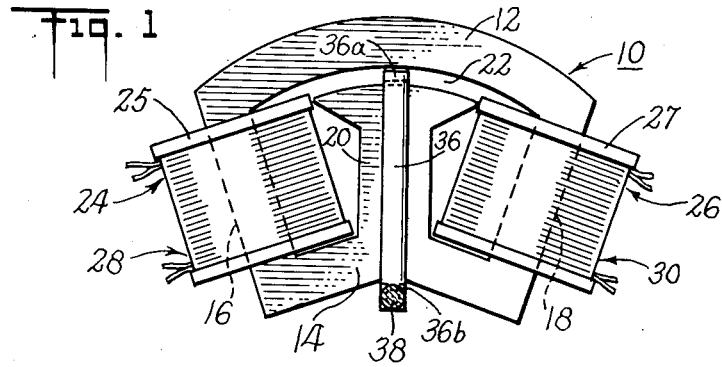
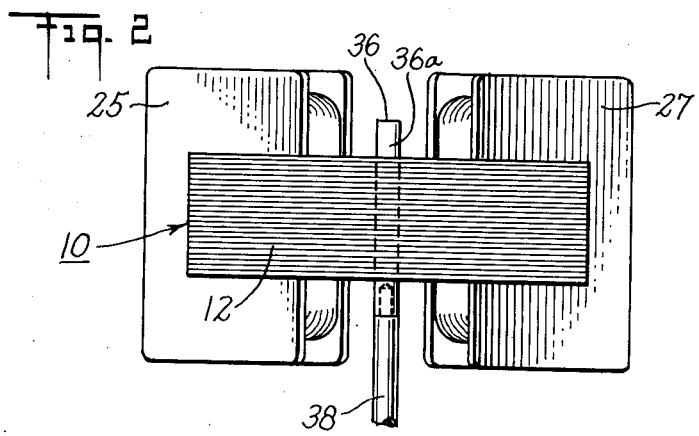
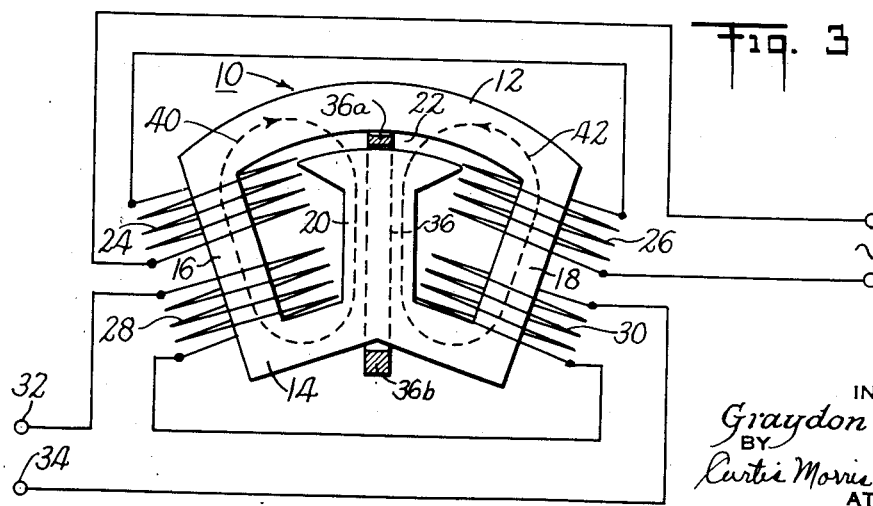
INVENTOR
Graydon Smith
BY
Curtis Morris & Safford
ATTORNEYS May 30, 1961  G. SMITH  2,986,714
POSITION MEASURING DEVICE
Filed Oct. 21, 1958  2 Sheets-Sheet 2

INVENTOR
Graydon Smith
BY
Curtis Morris & Safford
ATTORNEYS

United States Patent Office 2,986,714
Patented May 30, 1961

2,986,714

POSITION MEASURING DEVICE

Graydon Smith, Concord, Mass., assignor, by mesne assignments, to Clevite Corporation Filed Oct. 21, 1958, Ser. No. 768,730

16 Claims. (Cl. 336—30)

This invention relates to position measuring apparatus. More particularly, this invention relates to improvements in apparatus adapted to produce an electrical output signal the magnitude of which varies in accordance with changes in the positioning of a movable input member. An example of prior apparatus of this general class is shown in U.S. Patent No. 2,631,272.

Conventional devices of this type comprise a magnetic core structure having elongated top and bottom members with three legs extending therebetween. A primary winding is wound on the center one of these three legs to produce flux around the two magnetic circuits formed by the respective outer legs. Secondary windings are mounted on the outer legs and arranged to produce an electrical output signal in accordance with the relative amounts of flux passing through these outer legs. The flux in the outer legs is controlled by a movable "flux-barrier" consisting of an electrically-conductive closed loop positioned to extend into an air-gap formed in the lower end of the center leg, i.e. adjacent the bottom core member. Typically this closed loop consists of a copper ring which encircles the bottom core member and is mounted for lateral movement through the air-gap to vary the relative distribution of the flux between the two outer legs in accordance with the amount of input motion.

In one embodiment of the present invention described herein, there is provided a position-measuring device that has at least as great a sensitivity as the conventional type described above, but is considerably smaller in physical size, e.g. about one-third the size of the usual measuring device. In this device, flux is produced by a pair of primary windings each wound on a respective one of the two outer legs along with the two secondary windings. It has been found that the flux produced by such a dual primary winding arrangement, as described in more detail, can be controlled in the same manner as the flux produced by a single winding on the center leg. By eliminating windings on the center leg, the magnetic core can be constructed more compactly thus reducing the overall size of the device.

Moreover, in this embodiment of the invention, the air-gap is at the upper end of the center leg and the flux-barrier is rotatably mounted at a point below the bottom core member, so that the flux-barrier encircles the center leg and extends very nearly the full height of the measuring device. Thus the length of the flux-barrier, as measured between its mounting point and the air-gap, is considerably increased without correspondingly increasing the overall physical size of the measuring device. As a result, the extent of lateral movement of the flux-barrier through the air-gap (for a given angular input displacement) is increased compared to prior devices.

In accordance with a further aspect of the present invention, the end of the center leg adjacent the air-gap is flared out sideways a considerable distance to form a relatively wide air-gap. This wide air-gap accommodates extensive lateral shifts of the flux-barrier while still maintaining linearity between the output signal and input motion. In addition, the reluctance of the flux path through the air-gap is reduced, thus improving the efficiency of operation.

In prior devices of this type, it was not practical to provide the center leg with a flared-out end because of the difficulty in installing the primary winding on the core. As described in copending application Serial No. 693,919, filed November 1, 1957, the normal procedure is to insert the air-gap end of the center leg through the interior of an assembled winding. It will be apparent that, if the air-gap end is much wider than the rest of the leg, it will not be possible to place an assembled winding on the center leg. However, this problem is solved by the dual primary winding arrangement referred to above, since with this arrangement there is no need to place any winding on the center leg.

Accordingly, it is an object of the present invention to provide a position measuring device that is superior to those provided heretofore. Another object of this invention is to provide such a device that is physically compact yet highly sensitive. A further object of this invention is to provide a position measuring device that is adapted to accommodate input motions of substantial size. A still further object of this invention is to provide such a position measuring device that is inexpensive to manufacture and reliable in operation. Other objects, advantages and aspects of the present invention will be in part apparent from, and in part pointed out in, the following description considered together with the accompanying drawings, in which:

Figure 1 is a side elevation view of apparatus constructed in accordance with the present invention;

Figure 2 is a plan view of the apparatus shown in Figure 1;

Figure 3 is a schematic diagram showing the electrical connections to the windings of the device shown in Figure 1;

Figure 4:
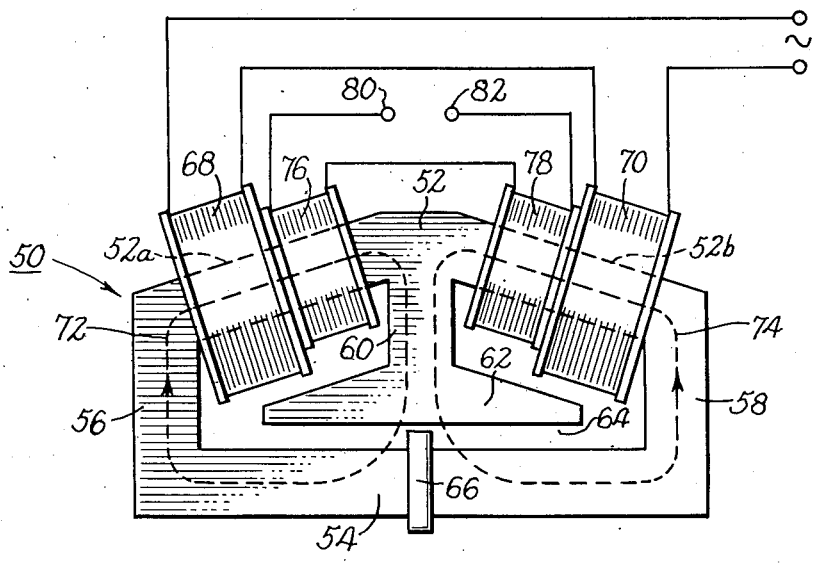
Figure 4 is a schematic diagram showing a modified form of the invention.

Referring now to Figures 1 and 2, the device shown there comprises a compact magnetic core structure 10 having a curved top member 12 and a bottom member 14 in the shape of an inverted V. Outer legs 16, 18 and a center leg 20 extend between corresponding parts of the top and bottom members. The upper end of the center leg is interrupted and flared out to form a relatively wide, curved air gap 22 between the center leg and the top member 12.

Referring also to Figure 3, the outer legs 16, 18 are provided with respective identical primary windings 24, 26 which are energized in series by a source of alternating current. Respective identical secondary windings 28, 30 also are wound on these legs and are connected in series-opposition to a pair of output terminals 32, 34. The primary windings are positioned closely adjacent the air-gap 22 in order to minimize background signals due to unbalanced leakage flux effects, in accordance with the invention disclosed in my copending application Serial No. 586,031, filed on May 21, 1956.

Surrounding the center leg 20 is a vertical flux-barrier 36 consisting of a rectangular closed loop of electrically-conductive material such as copper. The top element 36a of this flux-barrier extends through the air-gap 22, and the bottom element 36b is secured to a shaft 38 which is rotatable to shift the element 36a back and forth generally in a lateral direction through the air-gap. The shaft 38 is located in the "notch" of the V-shaped bottom member, and is connectible to an input member (not shown) the angular positioning of which it is desired to measure. Because of the absence of windings on the center leg 20, the flux-barrier 36 can be fitted closely about this leg and thereby further assure that the overall size of the measuring device is relatively small; referring to Figure 2, it will be seen that the flux-barrier does not extend out beyond the sides of the coil bobbins 25, 27.

As indicated by the dashed lines 40, 42 in Figure 3, the magnetic core 10 forms two magnetic circuits both passing through the center leg 20. Since essentially no net flux can pass through the closed loop of the flux-barrier 36, these two magnetic circuits are effectively isolated from each other. That is, all the flux (except leakage flux) produced by the left-hand primary winding 24 passes across the air-gap 22 to the left of the element 36a, and similarly all the flux produced by the right-hand primary winding 26 passes across the air-gap to the right of the element 36a.

When the flux-barrier 36 is positioned in the center of the air-gap 22 (as shown) the lateral width of the air-gap to the left of element 36a will be equal to the width of the gap to the right of this element. Hence, the magnetic reluctances of the two paths 40, 42 will be the same, so that the flux produced around these circuits by the windings 24, 26 will be equal. Thus, the secondary windings 28, 30 will produce equal voltages with the result that no net voltage appears between the output terminals 32, 34.

If, for example, the flux-barrier 36 is rotated towards the right-hand outer leg 18, the air-gap area to the left of element 36a will increase while the air-gap area to the right of this element will decrease. Therefore, the reluctance of magnetic circuit 40 will decrease while the reluctance of magnetic circuit 42 will increase, with the result that the impedance of primary winding 24 is increased and the impedance of primary winding 26 is decreased. Consequently, the voltage across winding 24 will go up, while the voltage across winding 26 will go down, and the flux through the left-hand outer leg 16 will increase while the flux through the right-hand outer leg 18 will decrease.

With these changes of flux in the outer legs 16 and 18, the voltages induced in the secondary windings 28, 30 will be correspondingly unbalanced so that a net output voltage will appear between the output terminals 32, 34. The magnitude of this voltage is determined by the extent of movement of the flux-barrier 36, and the phase of this voltage is determined by the direction of flux-barrier movement away from its center position.

Because of the relatively great vertical length of the flux-barrier 36, a small angular movement of the shaft 38 will produce a substantial lateral shifting of the element 36a. The flared-out upper end of the center leg 20 provides an air-gap of considerable lateral width which accommodates such substantial shifts of the flux-barrier while maintaining good linearity between the input motion and the output signal. Moreover, the increased lateral width of the air-gap reduces the total reluctance of the magnetic circuit and thus increases the inductive impedance of the windings relative to their resistance; as a result, the output signal is less affected by changes in winding resistance caused by variations in ambient temperature. This flared-out leg construction is made practical because the flux is produced by primary windings on the outer legs 16, 18, and therefore it is unnecessary to shape the center leg in such a way that it can be inserted into an assembled primary winding as in prior devices.

Figure 4 shows a modified form of the invention particularly adapted to measure relatively long movements. This arrangement includes an approximately rectangular magnetic core 50 having a top member 52 the two arms 52a, 52b of which slope downwardly in an inverted V-shape. The bottom 54 is straight, and outer legs 56, 58 and a center leg 60 extend between the top and bottom members. The center leg is flared-out laterally at its lower end 62 to form an extended air-gap 64 adjacent the bottom core member 54. A flux-barrier 66 encircles the bottom member and is shiftable laterally through the air-gap in accordance with the movements of an input member (not shown) secured thereto.

Flux is produced by a pair of primary windings 68, 70 on the respective arms 52a, 52b of the top core member. As in the Figure 3 embodiment, these primary windings are connected in series and are energized by a source of alternating current to produce flux around a respective pair of magnetic circuits 72, 74 passing across the gap 64 on opposite sides of the flux-barrier 66. When the flux-barrier is centered in the gap, the flux in these magnetic circuits will be equal, and will induce equal and opposite voltages in a corresponding pair of series-connected secondary windings 76, 78 on the core arms 52a, 52b. Thus, in this condition there will be no output signal fed to terminals 80, 82.

When the flux-barrier 66 is moved to either side of center, the flux in one of the magnetic circuits 72, 74 will increase, while the flux in the other of these circuits will decrease, as explained in connection with the Figure 3 embodiment. Hence, the voltages induced in the secondaries 76, 78 will be correspondingly unbalanced so as to produce a proportional output voltage at terminals 80, 82.

It should be noted that this construction wherein all the windings are mounted on the top core member 52, adjacent the flared-out end 62 of the center leg, permits the core to be arranged in a very compact and efficient manner. Moreover, typically in position-measuring devices of this general class the primary windings will be physically larger than the secondary windings (as shown), so that the Figure 4 construction is particularly advantageous in that the top member arms 52a, 52b can be sloped downwards while still providing sufficient "window space" for the coils. As a practical matter, by using this novel arrangement, a position-measuring device can be provided which is no larger than a conventional device, but which has an air-gap width (laterally) that is twice that of the conventional device.

Figure 5:
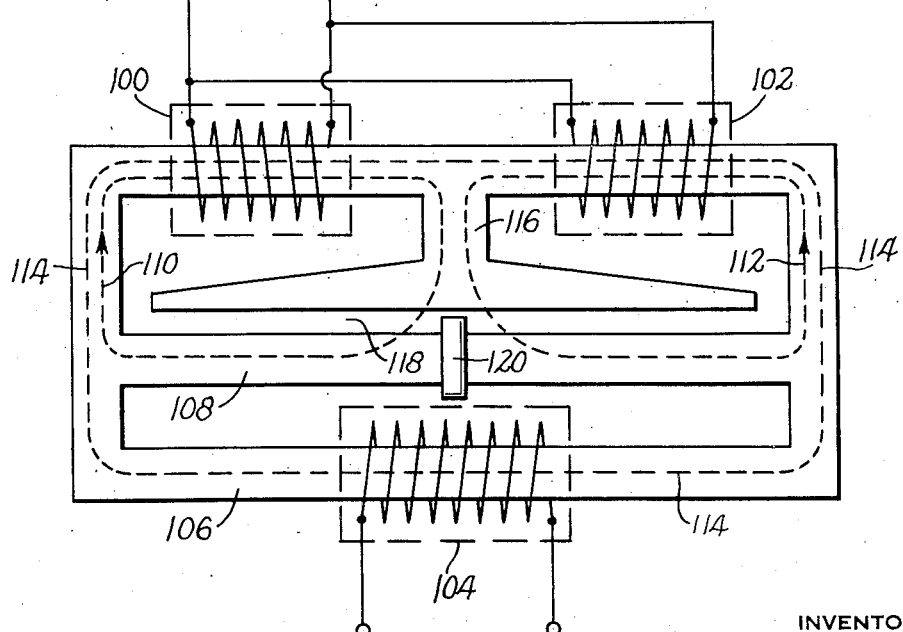
Figure 5 is a schematic diagram showing another modified form of the invention.

Figure 5 shows a modified construction wherein the primary windings 100, 102 are connected in parallel to a source of alternating current. In this arrangement, the output signal is produced by a single secondary winding 104 placed on an auxiliary core member 106 which extends parallel to, and between the ends of, the usual bottom core member 108.

The operation of this embodiment can best be explained by considering the three magnetic circuits indicated by dashed lines 110, 112, 114. The first two of these circuits 110, 112 link the respective primary windings 100, 102, and return through the center leg 116 and the air-gap 118. The third circuit 114 links both primaries 100, 102 and returns through the auxiliary core member 106.

The reluctances of the first two circuits 110, 112 are controlled by a flux-barrier 120 which surrounds the bottom core member 108 and is laterally movable within the air-gap 118. When the flux-barrier is centered (as shown), the reluctances of these two circuits will be equal, and hence the flux passing around these circuits also will be equal. The total flux passing through the primary winding 100 always will, of course, be equal to the total flux passing through the other primary winding 102, because the voltages across these two windings are equal. Therefore, when the flux in the first circuit 110 is equal to the flux in the second circuit 112, there can be no flux in the third circuit 114, and no output signal will be produced by the secondary winding 104.

When, for example, the flux-barrier 120 is moved to the right of the position shown in the drawing, the flux in the first circuit 110 will increase while the flux in the second circuit will decrease a corresponding amount. Since the total flux through the primary windings 100, 102 must remain unchanged, flux will circulate around the third circuit 114 to maintain this condition. In the left-hand primary winding 100, this third circuit flux will oppose the flux in the first circuit 110; in the other primary winding 102, the third circuit flux will augment the flux in the second circuit 112. The magnitude of flux in the third circuit 114 will be determined by the extent of movement of the flux-barrier 120, and the phase of this flux will be determined by the direction in which the flux-barrier is moved away from center. Consequently, the output signal induced by this flux in the secondary winding 104 will provide a measure of the lateral positioning of any input element (not shown) connected to the flux-barrier.

Although specific preferred embodiments of the invention have been set forth in detail, it is desired to emphasize that these are not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

I claim:

1. A position measuring device comprising, in combination, a magnetic structure arranged to form two magnetic circuits having a portion thereof in common, first and second primary windings wound on said magnetic structure and coupled respectively to said first and second circuits in regions thereof remote from said common portion, said primary windings being arranged to produce flux around said two magnetic circuits, first and second secondary windings wound on said magnetic structure and coupled respectively to said first and second magnetic circuits in regions thereof remote from said common portion to produce an output voltage responsive to the amounts of flux in said two magnetic circuits, said magnetic structure being provided with air-gap means in series with both of said magnetic circuits, and movably-mounted flux-barrier means comprising a closed loop of electrically-conductive material extending into said air-gap means to control the relative distribution of flux between said two magnetic circuits.

2. A position measuring device comprising, in combination, a magnetic structure including top and bottom members and having a center leg and a pair of outer legs extending therebetween, said magnetic structure being arranged to form two magnetic circuits both passing through said center leg and each passing through a respective one of said outer legs, first and second primary windings wound on said magnetic structure and coupled respectively to said first and second circuits in regions thereof remote from said center leg, said primary windings being arranged to produce flux around said two magnetic circuits, first and second secondary windings wound on said magnetic structure and coupled respectively to said first and second magnetic circuits in regions thereof remote from said center leg to produce an output voltage responsive to the amounts of flux in said two magnetic circuits, said magnetic structure being provided with air-gap means in series with both of said magnetic circuits, and movably-mounted flux-barrier means comprising a closed loop of electrically-conductive material extending into said air-gap means to control the relative distribution of flux between said two magnetic circuits in accordance with the positioning of an input member.

3. A compact position measuring device comprising, in combination, magnetic material forming elongated top and bottom members with a center leg and a pair of outer legs extending therebetween, said magnetic material establishing two magnetic circuits both passing through said center leg and each passing through a respective one of said outer legs, first and second primary windings wound on said outer legs respectively, said primary windings being arranged to produce flux around said two magnetic circuits, first and second secondary windings wound on said outer legs respectively and connected together to produce an output voltage responsive to the relative amounts of flux in said two magnetic circuits, said magnetic structure being provided with air-gap means in series with both of said magnetic circuits, and movably-mounted flux-barrier means comprising a closed loop of electrically-conductive material extending into said air-gap means to control the relative distribution of flux between said two magnetic circuits.

4. A compact position measuring device comprising, in combination, a magnetic structure consisting of top and bottom members and including a center leg and a pair of outer legs extending therebetween, said magnetic structure being arranged to form two magnetic circuits both passing through said center leg and each passing through a respective one of said outer legs, first and second primary windings coupled to said two magnetic circuits respectively in regions thereof remote from said center leg, first and second secondary windings coupled to said two magnetic circuits respectively in regions thereof remote from said center leg to produce an output voltage responsive to the relative amounts of flux in said two magnetic circuits, said center leg being interrupted to form an air-gap in series with both of said magnetic circuits, the end of said center leg adjacent said air-gap being flared out a substantial distance laterally to establish an air-gap of considerable width, and a movably-mounted flux-barrier comprising a closed loop of electrically-conductive material extending into said air-gap to control the relative distribution of flux between said two magnetic circuits.

5. Position measuring apparatus comprising, in combination, magnetic material forming elongated top and bottom members with a center leg and a pair of outer legs extending therebetween, said magnetic material establishing two magnetic circuits both passing through said center leg and each passing through a respective one of said outer legs, first and second primary windings coupled respectively to the arms of said top member that are on opposite sides of said center leg, said primary windings being arranged to produce flux around said two magnetic circuits, first and second secondary windings coupled respectively to said arms of said top member to produce an output voltage responsive to the relative amounts of flux in said two magnetic circuits, said center leg being interrupted adjacent said bottom member and flared-out laterally to form an air-gap of substantial width in series with both of said magnetic circuits, and movably-mounted flux-barrier means comprising a closed loop of electrically-conductive material extending into said air-gap to control the relative distribution of flux between said two magnetic circuits.

6. A compact position measuring device comprising, in combination, a magnetic structure consisting of elongated top and bottom members and including a center leg and a pair of outer legs extending therebetween, said magnetic structure being arranged to form two magnetic circuits both passing through said center leg and each passing through a respective one of said outer legs, first and second primary windings wound on said outer legs respectively to produce flux around said two magnetic circuits, said primary windings being connected in series to a pair of A.C. energizing terminals, first and second secondary windings wound on said outer legs respectively to produce an output voltage responsive to the relative amounts of flux in said two magnetic circuits, said center leg being interrupted to form an air-gap in series with both of said magnetic circuits, and a movably-mounted flux-barrier comprising a closed loop of electrically-conductive material extending into said air-gap to control the relative distribution of flux between said two magnetic circuits.

7. Position measuring apparatus comprising, in combination, magnetic material arranged to form top and bottom members and having a pair of outer legs and a center leg extending therebetween, said center leg being interrupted adjacent said top member to form an air-gap therebetween, primary winding means wound on said magnetic material to produce flux through the two magnetic circuits formed by said center leg and said outer legs respectively, secondary winding means wound on said magnetic material to produce an output signal responsive to the relative amounts of flux in said two outer legs, and a movably-mounted flux-barrier comprising a closed loop of electrically-conductive material having an element thereof positioned within said air-gap, said flux-barrier extending down alongside said center leg to said bottom member and effectively surrounding said center leg.

8. Position measuring apparatus comprising, in combination, magnetic material arranged to form top and bottom members and having a pair of outer legs and a center leg extending therebetween, said center leg being interrupted adjacent said top member to form an air-gap therebetween, primary winding means wound on said magnetic material to produce flux through the two magnetic circuits formed by said center leg and said outer legs respectively, secondary winding means wound on said magnetic material to produce an output signal responsive to the relative amounts of flux in said two outer legs, a movably-mounted flux-barrier comprising a closed loop of electrically-conductive material having an element thereof positioned within said air-gap, said flux-barrier extending down alongside said center leg to said bottom member, and pivotal mounting means for said flux-barrier adjacent said bottom member to accommodate rotary movement of said flux-barrier through said air-gap.

9. Position measuring apparatus comprising, in combination, magnetic material arranged to form top and bottom members and having a pair of outer legs and a center leg extending therebetween, said center leg being interrupted adjacent said top member and arranged to form a curved air-gap therebetween, primary winding means wound on said magnetic material to produce flux through the two magnetic circuits formed by said center leg and said outer legs respectively, secondary winding means wound on said magnetic material to produce an output signal responsive to the relative amounts of flux in said two outer legs, a flux-barrier comprising a closed loop of electrically-conductive material having an element thereof positioned within said air-gap, said flux-barrier closed loop extending down along both sides of said central leg to underneath said bottom member, and rotatable mounting means for said flux-barrier adjacent said bottom member for permitting said flux-barrier to be rotated through said curved air-gap, the radius of curvature of said air-gap being substantially equal to the length of said flux-barrier as measured from said air-gap to said mounting means.

10. A compact position measuring device comprising, in combination, magnetic material forming elongated top and bottom members with a center leg and a pair of outer legs extending therebetween, said magnetic material establishing two magnetic circuits both passing through said center leg and each passing through a respective one of said outer legs, first and second primary windings wound on said outer legs respectively, said primary windings being arranged to produce flux around said two magnetic circuits, first and second secondary windings wound on said outer legs respectively and connected together to produce an output voltage responsive to the relative amounts of flux in said two magnetic circuits, said center leg being interrupted to form an air-gap adjacent said top member, a movably-mounted flux-barrier comprising a closed loop of electrically-conductive material having an element positioned in said air-gap to control the relative distribution of flux between said two magnetic circuits, said flux-barrier closed loop extending down alongside said center leg to underneath said bottom member, and mounting means for said flux-barrier adjacent said bottom member.

11. A compact position measuring device comprising, in combination, a magnetic structure consisting of elongated top and bottom members and including a center leg and a pair of outer legs extending therebetween, said magnetic structure being arranged to form two magnetic circuits both passing through said center leg and each passing through a respective one of said outer legs, first and second primary windings wound on said outer legs respectively to produce an output voltage responsive to the relative amounts of flux in said two magnetic circuits, said center leg being interrupted to form a curved air-gap adjacent said top member, the upper end of said center leg being flared out laterally to establish an air-gap of substantial width, a movably-mounted flux-barrier comprising a closed loop of electrically-conductive material extending into said air-gap to control the relative distribution of flux between said two magnetic circuits, said flux-barrier surrounding said center leg and said bottom member, and pivotal mounting means for said flux-barrier adjacent said bottom member.

12. Apparatus as claimed in claim 11, wherein said bottom member is arranged in the shape of an inverted V, said pivotal mounting means being located underneath said bottom member in the notch of the V.

13. Position measuring apparatus comprising, in combination, magnetic material arranged to form two magnetic circuits having a portion thereof in common, said material further including auxiliary core means remote from said common portion and coupling together said two magnetic circuits, said common portion being interrupted to form an air-gap in series with both of said magnetic circuits, primary winding means wound on said magnetic material remote from said common portion to produce flux through said two magnetic circuits, secondary winding means wound on said magnetic material remote from said common portion to produce an output signal responsive to the relative amounts of flux in said two magnetic circuits, and a movably-mounted flux-barrier comprising a closed loop of electrically-conductive material having an element thereof positioned within said air-gap to control the relative amounts of flux in said two magnetic circuits.

14. A compact position measuring device comprising, in combination, a magnetic structure including top and bottom members and having a center leg and a pair of outer legs extending therebetween, said magnetic structure being arranged to form two magnetic circuits each having first and second portions, said first portions both passing in common through said center leg, said second portions consisting of said outer legs respectively in combination with corresponding parts of said top and bottom members, first and second winding means coupled respectively to said second portions of said magnetic circuits, said winding means substantially filling the interior spaces between said outer legs and said center leg, input circuit means for energizing said winding means with alternating current, output circuit means coupled to said winding means for producing an output signal responsive to the amounts of flux in said two magnetic circuits, said magnetic structure being provided with air-gap means in said center leg, and movably-mounted flux-barrier means comprising a closed loop of electrically-conductive material extending into said air-gap means to control the relative distribution of flux between said two magnetic circuits in accordance with the positioning of an input member.

15. A compact position measuring device comprising, in combination, a magnetic structure including top and bottom members and having a center leg and a pair of outer legs extending therebetween, said magnetic structure being arranged to form two magnetic circuits both passing in common through said center leg, first and second winding means wound respectively on said magnetic circuits in regions thereof remote from said center leg, said winding means substantially filling the interior spaces between said outer legs and said center leg, input circuit means for energizing said winding means with alternating current to produce flux around said two magnetic circuits, output circuit means coupled to said winding means for producing an output signal responsive to the amounts of flux in said two magnetic circuits, said center leg being interrupted adjacent one of said members to form an air-gap, the end of said center leg adjacent said air-gap being flared out laterally a substantial distance, and movably-mounted flux barrier means comprising a closed loop of electrically-conductive material extending into air-gap to control the relative distribution of flux between said two magnetic circuits in accordance with the positioning of an input member.

16. Position measuring apparatus comprising, in combination, magnetic material forming elongated top and bottom members with a center leg and a pair of outer legs extending therebetween, the lateral arms of said top member sloping downwardly away from the region of joinder with said center leg, said magnetic material establishing two magnetic circuits both passing through said center leg and each passing through a respective one of said outer legs, first and second primary windings coupled respectively to said arms of said top member, said primary windings being arranged to produce flux around said two magnetic circuits, first and second secondary windings coupled respectively to said arms of said top member to produce an output voltage responsive to the relative amounts of flux in said two magnetic circuits; said primary windings being positioned immediately adjacent said outer legs respectively, with the secondary windings alongside thereof and immediately adjacent said center leg, said primary windings being substantially larger in overall physical size than said secondary windings; said center leg being interrupted adjacent said bottom member and flared-out laterally to form an air-gap of substantial width in series with both of said magnetic circuits, and movably-mounted flux-barrier means comprising a closed loop of electrically-conductive material extending into said air-gap to control the relative distribution of flux between said two magnetic circuits.

References Cited in the file of this patent
UNITED STATES PATENTS

| | | |
|---|---|---|
| 400,515 | Thomson | Apr. 5, 1889 |
| 2,488,734 | Mueller | Nov. 22, 1949 |
| 2,631,272 | Smith | Mar. 10, 1953 |